United States Patent [19]
Diesinger

[11] 3,888,079
[45] June 10, 1975

[54] SOLID PROPELLANT ROCKET MOTOR

[75] Inventor: Walter Helmut Diesinger, Bergisch Gladbach, Germany

[73] Assignee: Dynamit Nobel AG, Germany

[22] Filed: Mar. 26, 1973

[21] Appl. No.: 344,631

[30] Foreign Application Priority Data
Mar. 25, 1972 Germany.......................... 2214802

[52] U.S. Cl. .................. 60/245; 60/250; 60/254; 102/34.5; 137/71
[51] Int. Cl. ........................ F02k 9/04; F02k 9/06
[58] Field of Search ...... 60/234, 225, 245, 253–256, 60/250, 200 A; 102/34.5, 37.7, 49.7; 137/67–71; 251/1; 220/3, 24.5, 27

[56] References Cited
UNITED STATES PATENTS

| | | | |
|---|---|---|---|
| 2,726,977 | 12/1955 | See et al. ......................... | 60/200 A |
| 2,856,851 | 10/1958 | Thomas ........................... | 60/253 X |
| 3,328,964 | 7/1967 | Williams et al. .................. | 60/253 |
| 3,340,691 | 9/1967 | Mangum ........................... | 60/250 |
| 3,442,084 | 5/1969 | Dilchert et al. .................. | 60/250 |
| 3,445,032 | 5/1969 | Raidl et al. ...................... | 137/68 X |
| 3,564,845 | 2/1971 | Friedman et al. ................ | 60/250 X |
| 3,568,448 | 3/1971 | Webb ............................... | 60/250 |

FOREIGN PATENTS OR APPLICATIONS
937,473    9/1963    United Kingdom.................. 137/68

*Primary Examiner*—William L. Freeh
*Assistant Examiner*—Robert E. Garrett
*Attorney, Agent, or Firm*—Craig & Antonelli

[57] ABSTRACT

A rocket motor having at least two coaxial combustion chambers, one arranged behind the other and each containing a solid propellant charge. A partition is positioned between the first and second chamber and between each successively sets or pairs of chambers. This partition has closure means for preventing ignition of the second charge during ignition of the first and for allowing through flow due to excess pressure generated by ignition of the second propellant charge.

11 Claims, 9 Drawing Figures

PATENTED JUN 10 1975          SHEET 1          3,888,079

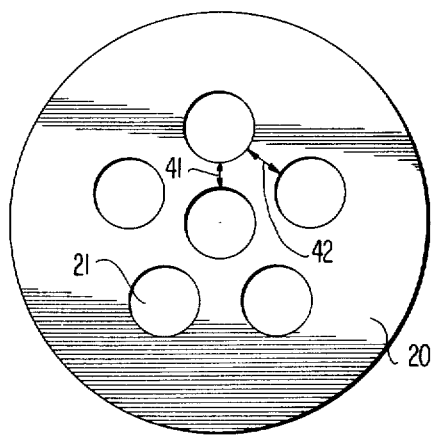
FIG. 4
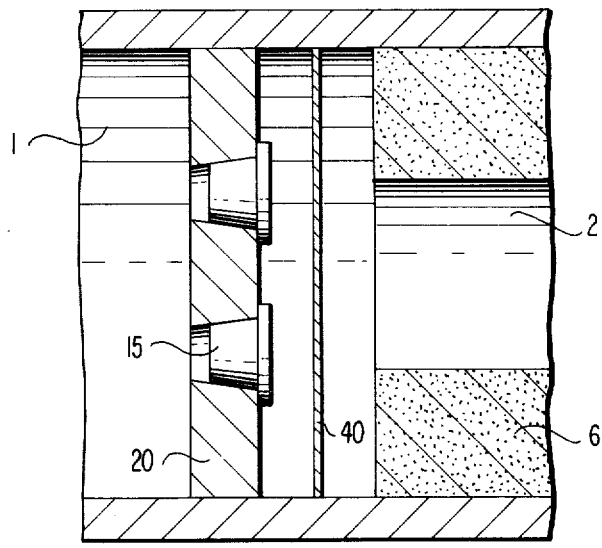
FIG. 5
FIG. 6
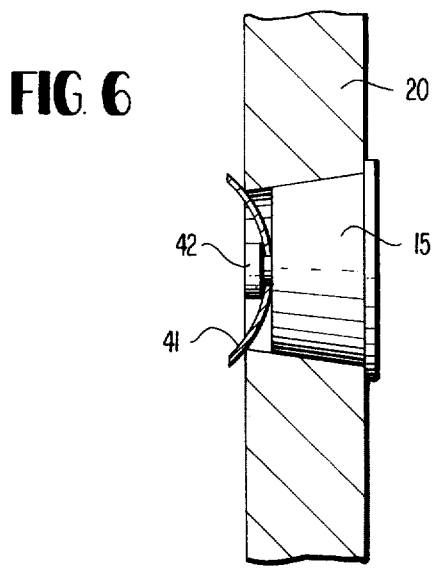
FIG. 7
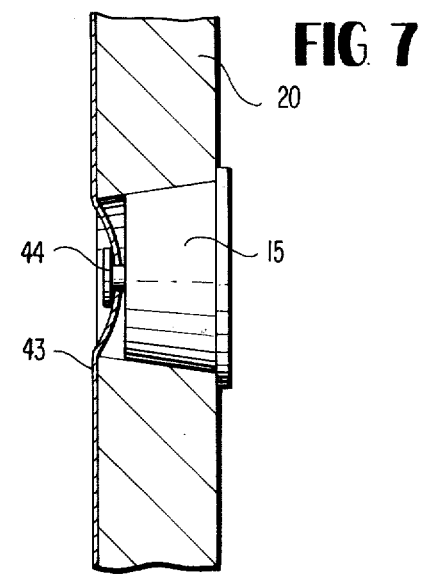

SOLID PROPELLANT ROCKET MOTOR

The present invention relates to a solid propellant rocket motor with two or more coaxially arranged combustion chambers with charges having the same or a different power characteristics; and more particularly to such a rocket motor having combustion chambers which cooperate with a common nozzle, are equipped with, respectively, one ignition device activatable in a predetermined time interval, and are secured with respect to each other agaist unintentional burning and are separated from each other by a partition means.

A solid propellant rocket motor of the internally burning type is known from U.S. Pat. No. 2,956,401, wherein the combustion chambers are separated from one another by rings. Such a rocket motor with a take-off or booster engine and a cruising engine has the advantage, inter alia, that the range is increased and the deviation from a selected flight path is reduced by an increase in the average flight velocity. Besides, there is also the possibility of reducing the range, for example, by only igniting the propellant charge closest to the nozzle. However, an essential disadvantage is the pressure and temperature buildup in all combustion chambers, made possible by the rings. Therefore, in case of the fuels employed nowadays, it is practically unavoidable that the combustion chambers are simultaneously ignited, since the insulations usually do not withstand the high temperatures and pressures generated in the first ignited chamber.

Therefore, it is an object of the present invention to provide a solid propellant rocket motor of the aforementioned type which does not exhibit these disadvantages and which is suitable, in particular, for increasing the range of a rocket while maintaining the external dimensions and without any substantial change in the firing conditions. Also the minimum range of the rocket can simultaneously be reduced.

This object is attained by a solid propellant rocket motor wherein the series of charges are separated from one another by partition or intermediate wall means which open up, at least partially, to provide a through-flow cross section due to excess pressure caused by ignition of the subsequent propellant charge.

Such a partition can be formed as a perforated plate, the holes of which are sealed by plugs. However, since small plugs, which consist, for example, of steel, can damage the nozzle wall, it is advantageous to manufacture these plugs of a soft material. Suitable for this purpose is rubber, for example. Depending on the type of soft material, e.g., in case of rubber, it is necessary however, in certain instances to thermally protect the plugs from the nozzle side by a radiation-reflecting and/or heat-absorbing layer of material. Rubber plugs can be provided, for example, with a layer of aluminum foil on the nozzle side. However, it is also possible to mount such a foil between the partition and the propellant charge on the nozzle side over the entire surface of the partition. If such a foil is arranged at a predetermined space from the partition, it is advantageous, in view of the pressure load produced during the burning of the propellant charge adjacent to the nozzle, to provide the foil with several pressure equilazation openings, in order to keep the pressure difference effective on the foil at a minimum. However, the foil can also be disposed directly adjacent to the partition, so that it can rest thereon. Also, the plugs can be provided with a layer of heat-absorbing substances, e.g., ammonium oxalate and oxamide, toward the nozzle side, protecting the plugs from melting due to the high temperature resulting from the burning of the propellant charge adjacent to the nozzle; consequently, a progression of the burning to the subsequent propellant charge is avoided. The heat-absorbing substance is a material absorbing thermal energy by chemical reaction and/or evaporation. Further examples of such heat-absorbing substances are disclosed in British Pat. No. 1,014,043. Other substances can be employed which melt and vaporize below the maximally permissible temperature of the plug to be protected. For example, when the plug is made of steel, foils of silver or tin can be used.

Although the plugs can be glued or cemented into the holes, this yields poorly reproducible results, because the plugs either are detached too early, or they are not released at all. This, moreover, has a disadvantageous effect on the burning of the subsequent propellant charge. Therefore, it is advantageous to attach the plugs on the nose side on the side away from the nozzle by means of flat springs. The flat spring prevents each plug from falling out of its hole, for example during transporting, while this spring cannot retain the plug after ignition of the propellant charge adjacent to the nose, i.e., on the nose side of the partition, because of the excess pressure exerted in the direction toward the nozzle, whereby each hole is vacated, i.e., each plug is blown out of its associated hole.

It has proved to be especially advantageous to arrange a foil as a support, for example by gluing, on the side of the perforated plate adjacent the nose, to which the plugs are attached, for example, by a threaded connection, i.e, by bracing the elastic foil against the plugs with the aid of mounting screws. The foil can burn up together with or after the detachment of the plugs. The foil must have such a mechanical strength that it retains the threadedly connected plugs securely in the perforated plate during the customary mechanical stresses, for example during the vibration test or during the transportation of the rocket.

In order to improve the seal between the combustion chambers, further provision can be made to form the plugs of a conical configuration and/or to equip them with a sealing ring.

The perforated plate is suitably designed so that the sum of the cross-sectional area of all holes is larger than the narrowest cross-sectional area of the nozzle.

Yet, it can happen that, during the burning of the second or three or subsequent propellant charge of the series, that the perforated plate through which the thus-produced gases are ejected, is itself at least partially destroyed, so that it is advantageous to arrange the holes in the perforated plate in a stellate arrangement so that the distance between the outer holes and the central hole is smaller than the spacing between each of the outer holes. This arrangement prevents the detachment of larger pieces from the perforated plate and the flinging of such pieces against the nozzle wall. This improved effect can additionally be enhanced by making the perforated plate thinner in the center than at the edge, by imparting, for example, the shape of a dispersion lens to the plate.

However, in place of using plugs, the perforated plate can also be sealed by means of a thin sheet or diaphragm mounted on the nozzle side of the perforated plate. This sheet or diaphragm is then supported by the perforated plate against the pressure in the combustion chamber on the nozzle side, whereas this sheet or diaphragm, after ignition of the propellant charge in the second or further combustion chamber, is destroyed by the pressure built up in this chamber, thus freeing the way for the gases produced in the second or further chamber.

It is furthermore possible to fashion the partition in the form of a dish which is curved toward the nozzle side, so that it can withstand the pressure in the combustion chamber on the nozzle side. This dish-shaped partition can likewise be protected on the nozzle side by a radiation-reflecting and/or heat-absorbing layer and can furthermore be provided with predetermined breaking or rupturing points or lines, facilitating its destruction during the ignition in the second or further chamber. Such a dish, serving as the partition, can be supported by abutments which are preferably not joined to the dish.

It is furthermore possible to equip one or more of the propellant charges on the nose side in such a manner that they contain ejectable substances which practically do not serve for drive or propelling purposes. For this purpose, materials for radar deception and fog generation are suitable, for example. Such a rocket can also be utilized as a flare or marker rocket. These ejectable substances are well known and conventional in the rocket art.

Additionally, there is the possibility to actuate a braking device by means of one or more propellant charges on the nose side, which device serves, for example, for reaching a target under a large angle of incidence, or for reaching a target located behind an obstacle. Such a braking device is described, for example, in German Patent Application No. P 21 22 796.3.

It will be appreciated that the rocket motor of the present invention is not limited to any particular burner type of propellant charge and is suitable, for example, for end burner as well as internal burner types of a propellant charge for smaller rockets to be manufactured in a rather large number.

The invention will be further understood from the following detailed description and with reference to the accompanying drawings wherein:

FIGS. 2 – 4 show various embodiments for the partition in the rocket motor;

FIG. 5 is a schematic view of the arrangement of a foil thermally protecting the partition;

FIG. 6 shows the arrangement for mounting of a plug by a spiral spring in a partition constructed as a perforated plate; and FIG. 7 shows the mounting of a plug by a foil in a partition constructed as a perforated plate.

Figure 1:
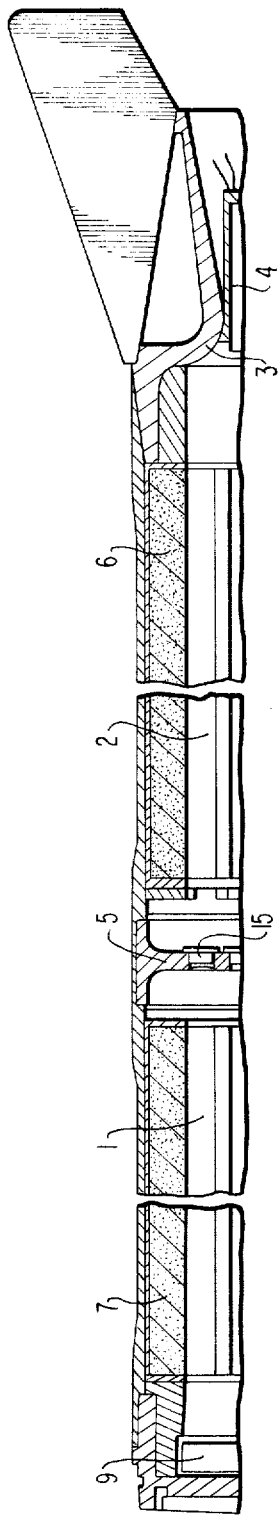
FIG. 1 shows a sectional view of a double-impulse rocket motor of the internal burner type having an internal partition in accordance with the present invention.

The rocket motor illustrated in FIG. 1 has two combustion chambers, 1 and 2, wherein more or less identical propellant charges 6 and 7, respectively, are housed. These charges are separated from each other by a partition 5. A tamp with igniter 4 is disposed in the nozzle 3, for igniting the propellant charge 6 on the nozzle side during the start of the missile. The partition 5 is of the form of a perforated plate sealed by plugs 15. The plugs 15 seal the two combustion chambers with respect to each other, so that, during the burning of the propellant charge 6 on the nozzle side, the propellant charge 7 is not ignited.

At an arbitrary instant after cutoff or burnout of the propellant charge 6 on the nozzle side, the propellant charge 7 on the nose side can be ignited by way of the second igniter 9. The plugs 15 in the partition 5 serve as tamping during this prcedure. The gases of the second propellant charge flow through the empty combustion chamber 2 and the nozzle 3 to the outside and thus generate a second thrust impulse.

The volumetric efficiency or degree of filling of the rocket motor which is dependent on the ratio of the burning area to the area of the narrowest nozzle cross section, can be increased, since the propellant charges or grains cannot burn simultaneously, and there is no danger of igniting the subsequent charge by an already burning charge. This also provides a larger maximum range of the rocket, insofar as a greater amount of fuel can be carried.

Since it is furthermore possible to burn only the propellant charge on the nozzle side, which is smaller than if a single, continuous propellant charge is employed, the minimum range of the rocket is likewise reduced.

The type and size of the two propellant charges need not be identical; they must merely permit the use of the same nozzle. This rocket motor is distinguished by low development and manufacturing costs, since more or less identical propellant charges are employed, whereby additionally a high reliability is achieved. Also, the thermal load on the rocket motor is small, since two or more comparatively brief thrust periods occur.

Due to the increase in the average flying velocity, the possibility for deviation is likewise reduced.

Since, with a given combustion chamber length, the degree of propellant charge filling can be increased, because the length of the charge only amounts to about one-half of a conventional charge, an advantage is also obtained when it is not desired to separate the two thrust phases chronologically and the ignition of the second charge takes place immediately after burnout of the first charge. In this case, an effective doubling of the burning time is achieved as compared to a conventional charge.

Furthermore, by the effective doubling of the total burning time with the same total impulse, a small nozzle is possible (reduction in resistance) and/or a high expansion ratio can be employed (increase of specific impulse).

Figure 3B:
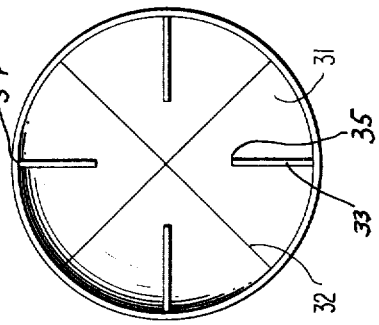
Figure 3A:
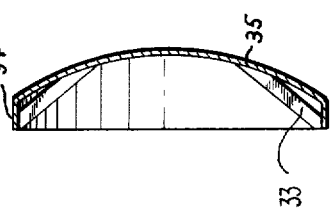
Figure 2B:
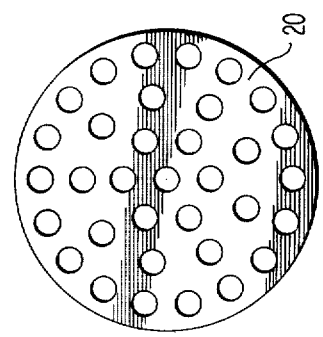
Figure 2A:
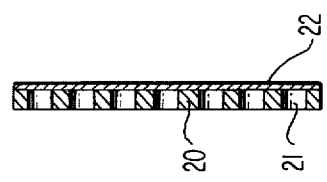

FIG. 2 illustrates one embodiment of a partition in the form of a perforated plate 20, the holes 21 of which are sealed by a thin sheet or diaphragm 22. FIG. 2a is a cross section through the partition of FIG. 2b, and FIG. 3a is a cross section through the partition shown in the embodiment of FIG. 3b. FIG. 3 shows another partition in the form of a dish 31 (the concave portion of which faces away from the nozzle when positioned in the rocket), exhibiting predetermined breaking lines 32 and supported or reinforced by supports 33. These supports 33 are joined to the dish 31 only with one of their ends, i.e., end 34, in order to prevent a disadvantageous effect on the purposeful disintegration of the dish 31; the other end of these stays, i.e., end 35, is in loose contact with the dish 31.

FIG. 4 shows yet another embodiment of a partition in the form of a perforated plate 20 wherein the holes 21 are disposed in a stellate arrangement so that the distance 41 between the central hole and the holes therearound is smaller than the spacing 42 between the holes arranged around the central hole.

FIG. 5 shows schematically an enlarged fragmentary view of the rocket motor shown in FIG. 1, wherein a foil 40 shielding the partition 20 is provided between the propellant charge 6 in the combustion chamber 2 on the nozzle side and the partition 20 is fashioned as a perforated plate and sealed by plugs 15. As indicated above, it is advantageous to provide the foil 40 with openings (not shown) for pressure equalization.

According to FIG. 6, the plugs 15 can be held in the perforated plate 5 by means of flat springs 41, the latter being attached to the plugs 15 by means of screws 42. These flat springs are to withstand usual mechanical stresses, but not the excess pressure produced by igniting the charge of the forward or nose-side in the nozzle direction. By this excess pressure, the plugs 15, the spring 41, and the screw 42 are detached or blown away from the perforated plate 20.

According to FIG. 7, the plugs 15 are held by a foil 43 glued to the nose side of the perforated plate 20, by tensioning the foil 43 and the plug 15 with respect to each other by mounting screws or setscrews 44.

Since the partition, after igniting the nozzle-side charge in the chamber 2 must withstand the combustion chamber pressure, the partition is advantageously manufactured of the same material as the walls or combustion chamber or the nozzle. Possible materials are steel, aluminum, fiber glass reinforced laminates or other composite materials. Moreover, in order to avoid damage to the nozzle wall during the ejection of the plugs, especially in case the nozzle is provided with the lining of graphite, for example, in the zone of the narrowest cross-section, the plugs are preferably made of a material which does not damage the nozzle wall. Further examples of suitable plug materials are synthetic rubber, thermoplastic synthetic resins, such as PVC or thermosetting resins such as epoxy resins.

What is claimed is:

1. In a solid propellant rocket motor with two or more coaxially arranged combustion chambers containing propellant charges of the same or of a different efficiency arranged in series one behind the other, which chambers cooperate with a common nozzle, are each equipped with one igniting device activatable in a predetermined time interval, and are secured with respect to each other against unintentional burning, the improvement which comprises partition means for separating the propellant charges from each other including closure means that open up, at least partially, to provide a throughflow cross-section due to the excess pressure caused by ignition of the subsequent propellent charge, said partition means including a perforated plate and said closure means including holes in said plate which are sealed by plugs, and means arranged on the side of the perforated plate opposite from said nozzle and attached to said plugs for securing said plugs to said plate.

2. The solid propellant rocket motor of claim 1, in which the sum of the cross-sectional area of all the holes in the perforated plate is larger than the narrowest cross-sectional area of the nozzle of the rocket motor.

3. The solid propellant rocket motor of claim 1, in which the plugs are made of a soft resilient material.

4. The solid propellant rocket motor of claim 3, in which the plugs and/or the entire partition are protected by a radiation-reflecting and/or heat-absorbing layer positioned on the nozzle side.

5. A solid propellant rocket motor of claim 1, in which the means for securing said plugs include a plurality of flat springs, one for each of said plugs.

6. The solid propellant rocket motor of claim 1, in which the the means for securing said plugs include a foil arranged on the side of the perforated plate opposite from said nozzle, said foil being secured to said perforated plate.

7. The solid propellant rocket motor of claim 1 in which the plugs are each of a conical configuration.

8. The solid propellant rocket motor of claim 1 in which the holes in the perforated plate are arranged in a stellate pattern with one hole being in the center of the plate and the others being spaced therefrom, the distance from the other holes to the central hole being smaller than the spacing between said other adjacent holes.

9. The solid propellant rocket motor of claim 1 in which the perforated plate is thinner in the center than along it periphery.

10. The solid propellant rocket motor of claim 1 in which one or more of the propellant charges on the nose side contain ejectable substances which practically do not serve for propulsion purposes.

11. The solid propellant rocket motor of claim 1 in which a braking device can be actuated by one or more propellant charges on the nose side.

* * * * *